(12) United States Patent
Simkowski

(10) Patent No.: US 6,374,992 B1
(45) Date of Patent: Apr. 23, 2002

(54) UNSTABLE ARTICLE CONVEYING DEVICE WITH DIVERTER

(75) Inventor: Donald J. Simkowski, Loveland, CO (US)

(73) Assignee: Goldco Industries, Inc., Loveland, CO (US)

(*) Notice: Subject to any disclaimer, the term of this patent is extended or adjusted under 35 U.S.C. 154(b) by 0 days.

(21) Appl. No.: 09/645,106

(22) Filed: Aug. 23, 2000

(51) Int. Cl.[7] .............................................. B65G 15/12
(52) U.S. Cl. ...................... 198/626.1; 198/634; 406/86
(58) Field of Search ............................. 198/620, 626.1, 198/681, 678.1, 448; 406/88, 86, 182

(56) References Cited

U.S. PATENT DOCUMENTS

| | | |
|---|---|---|
| 3,822,006 A | 7/1974 | Shuttleworth |
| 4,284,370 A | 8/1981 | Danler |
| 4,724,035 A | 2/1988 | Mann et al. |
| 4,822,214 A | 4/1989 | Aidlin et al. |
| 4,938,636 A | 7/1990 | Aidlin et al. |
| 5,028,174 A | 7/1991 | Karass |
| 5,100,265 A | 3/1992 | Mirkin |
| 5,147,153 A | 9/1992 | Aidlin et al. |
| 5,161,919 A | 11/1992 | Smith et al. |
| 5,174,430 A | 12/1992 | Ebira |
| 5,246,097 A | 9/1993 | Mc Coy et al. |
| 5,299,889 A | 4/1994 | Langenbeck |
| 5,501,552 A | 3/1996 | Simkowski |
| 5,567,091 A | 10/1996 | Johnson et al. |
| 5,630,679 A | 5/1997 | Simkowski et al. |
| 5,842,818 A | 12/1998 | Simkowski |
| 5,937,998 A | 8/1999 | Priero |

FOREIGN PATENT DOCUMENTS

EP 0668223 8/1995

*Primary Examiner*—Kenneth W. Noland
(74) *Attorney, Agent, or Firm*—Robert E. Harris

(57) ABSTRACT

A conveying device with a diverter is disclosed for conveying lightweight unstable articles, such as plastic bottles having a neck portion with a neck ring thereon. The unstable articles are conveyed along a first path established by a first guide unit to different ones of plural second paths established by a plurality of second guide units through a third path established by a third guide unit having a diverter to align a first end of the third path with the first path and to move the second end of the third path for alignment with the different ones of the plural second paths with a deviation in the third path between the ends thereof being established during aligning movement of the second end of the third path by flexing of a flexible bar positioned adjacent to the third path. A controller is utilized to control movement of the diverter to align the second end of the third path with different ones of the second paths, and the unstable articles are supported by flanges extending from chains in actuating guides positioned at opposite sides of the article paths and movable along the guides to urge the unstable articles along the article paths.

35 Claims, 7 Drawing Sheets

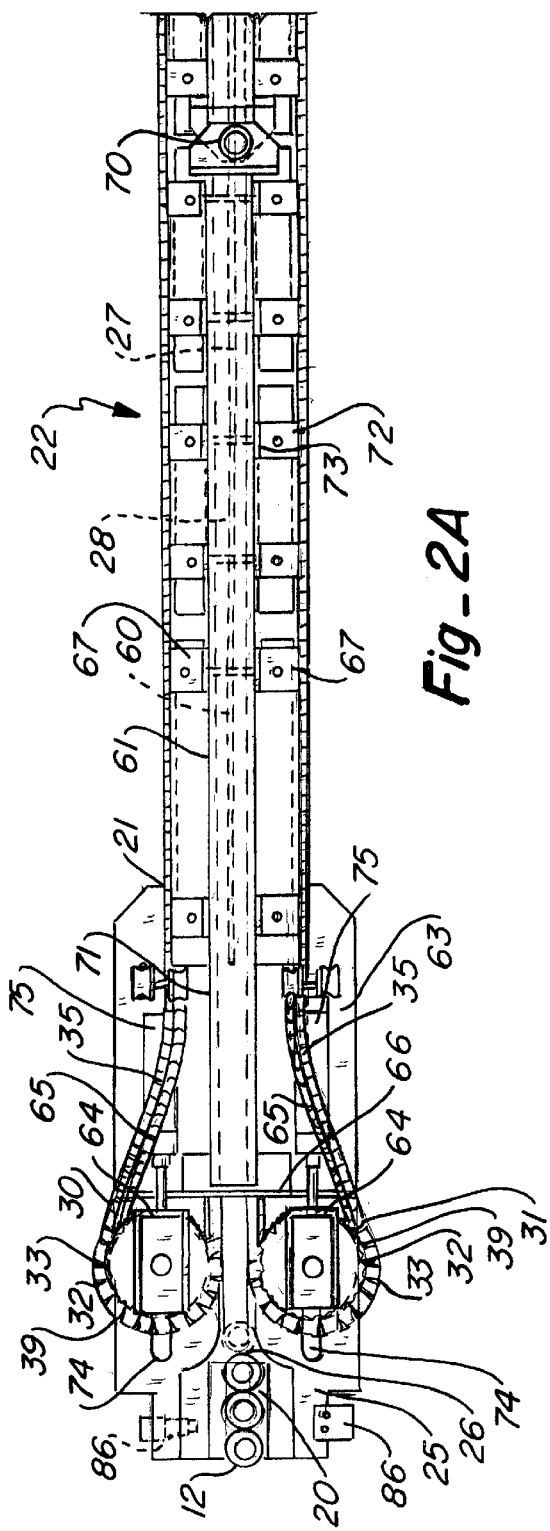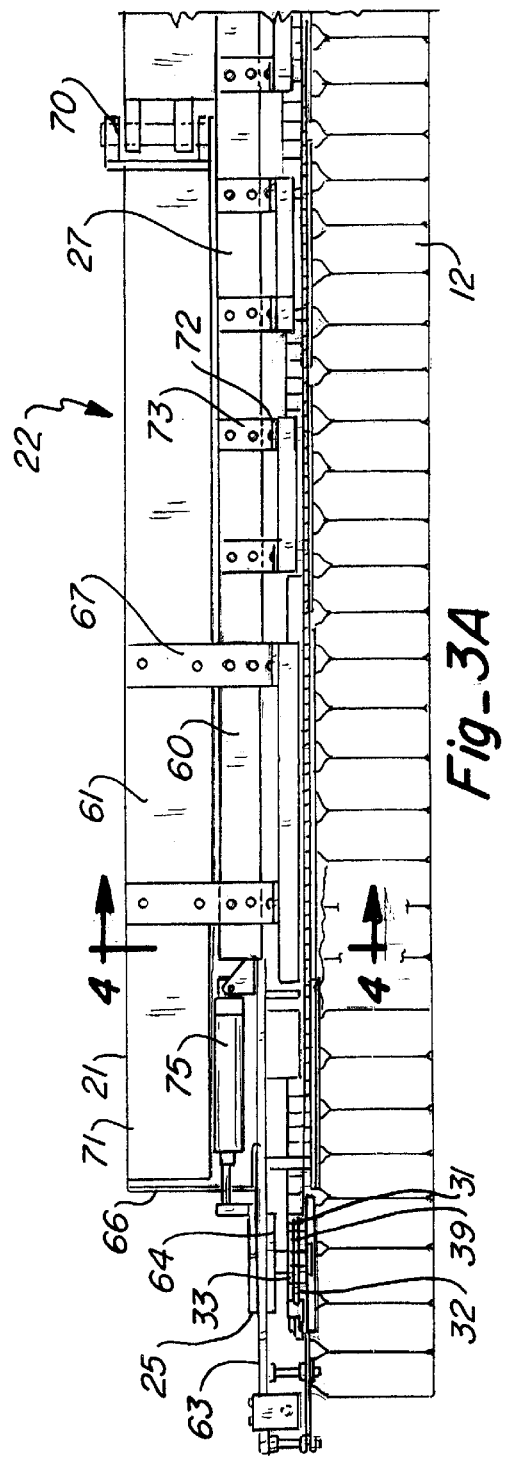

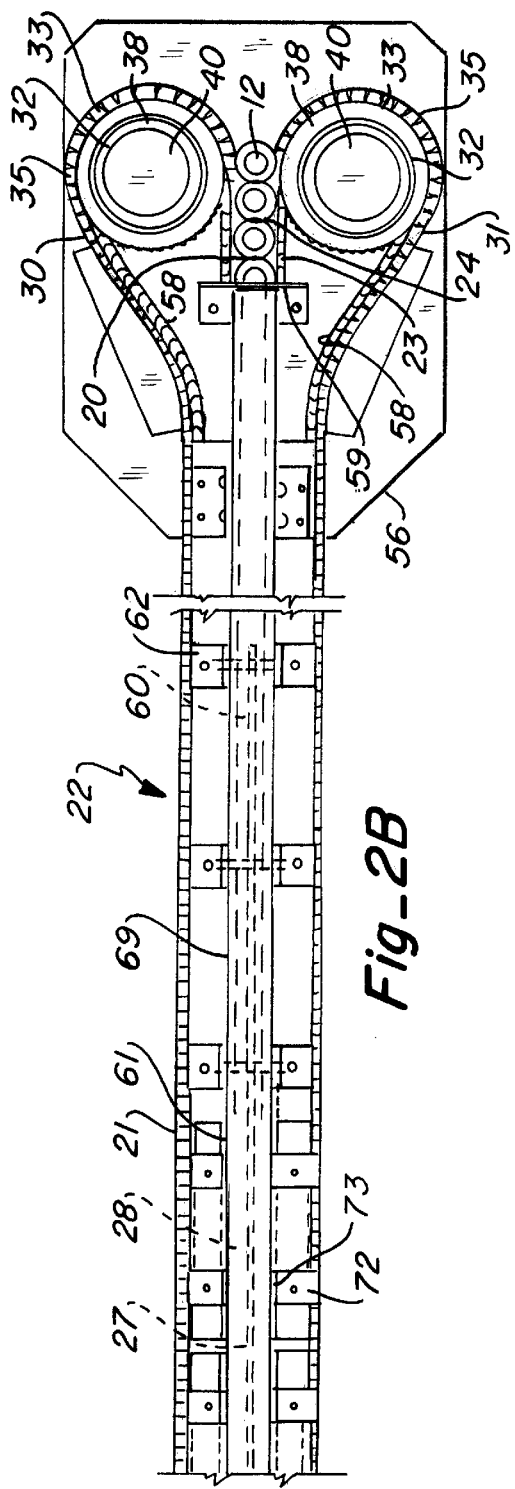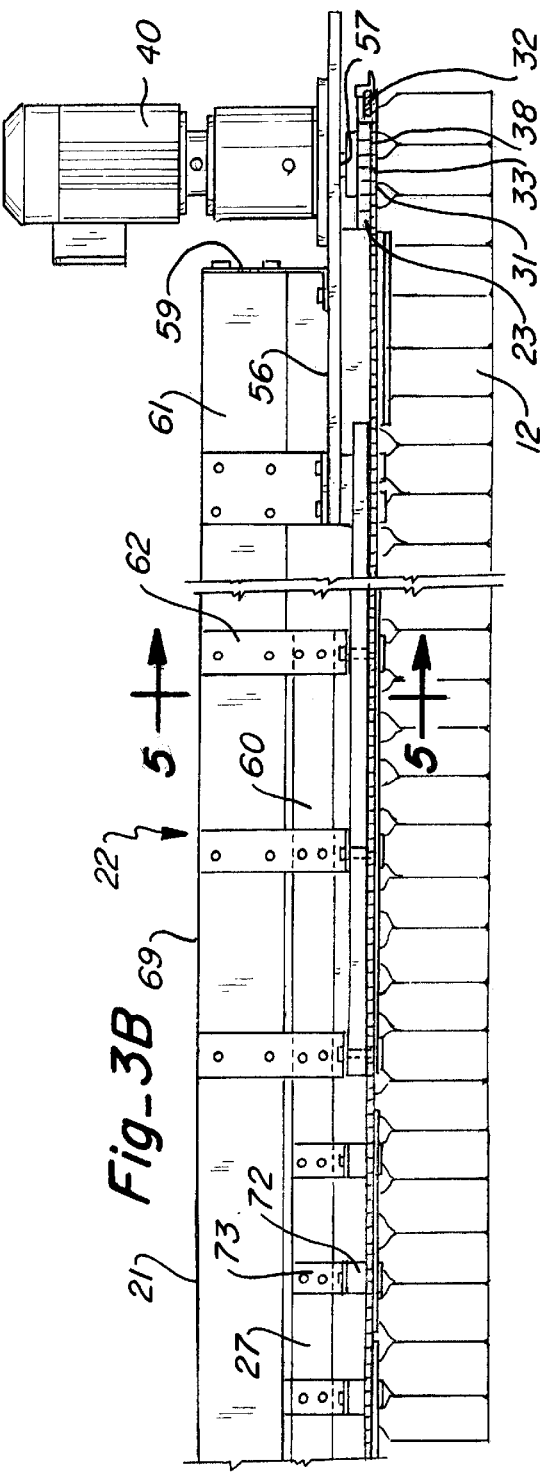

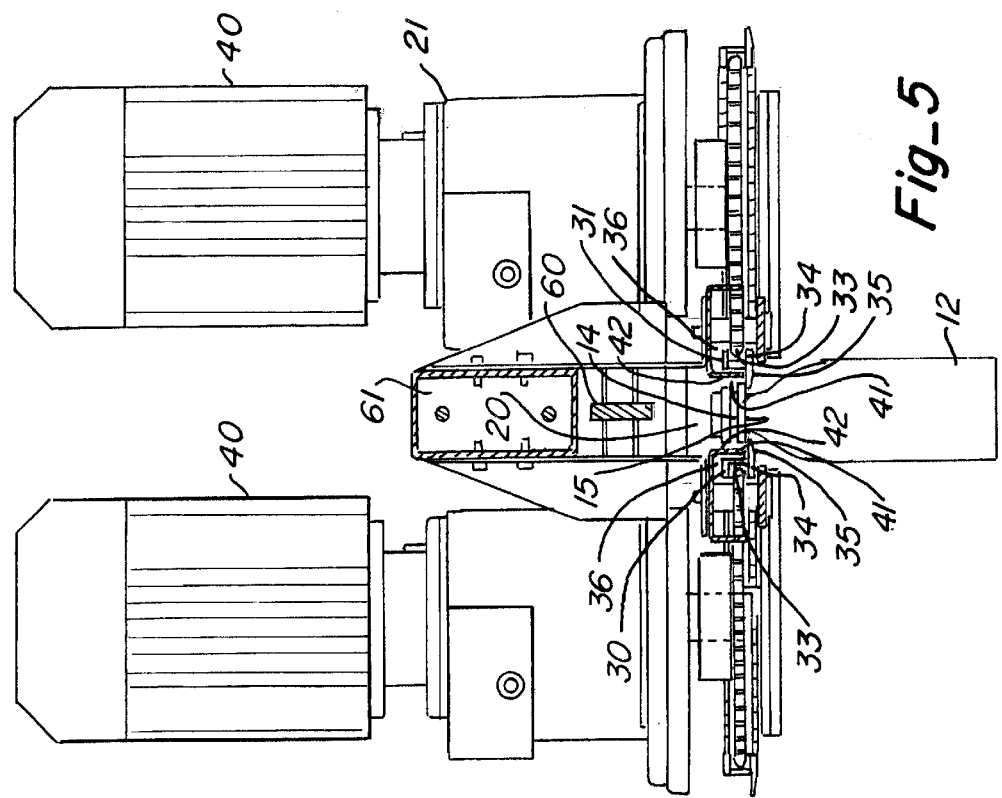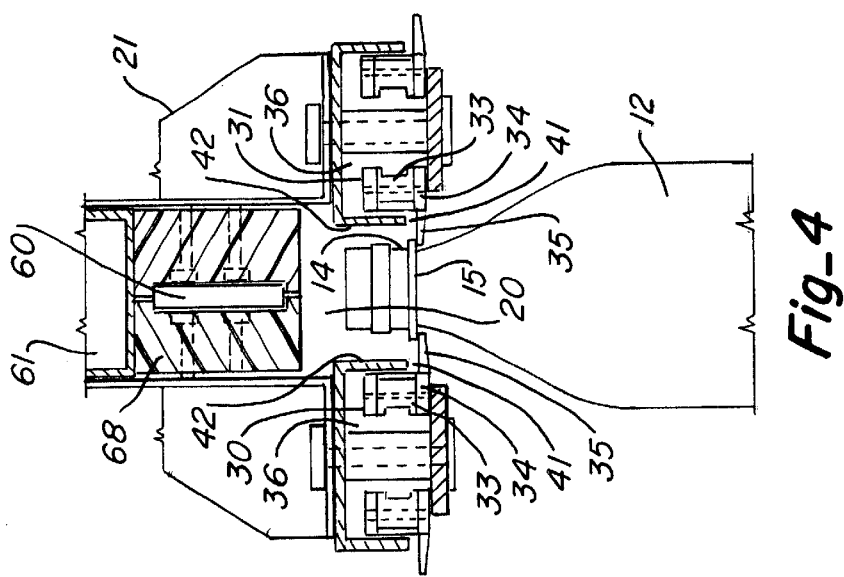

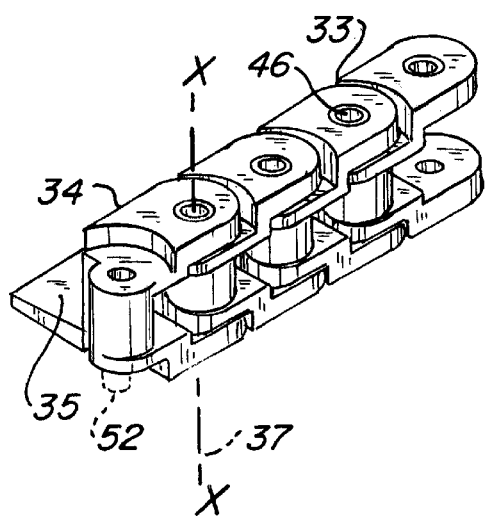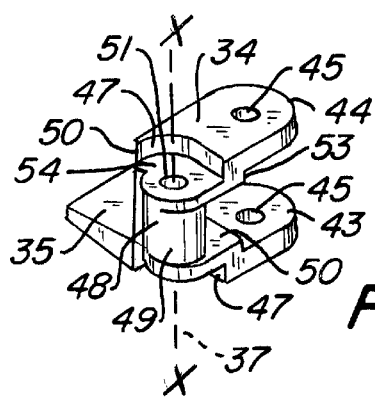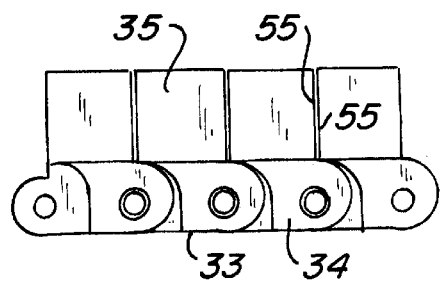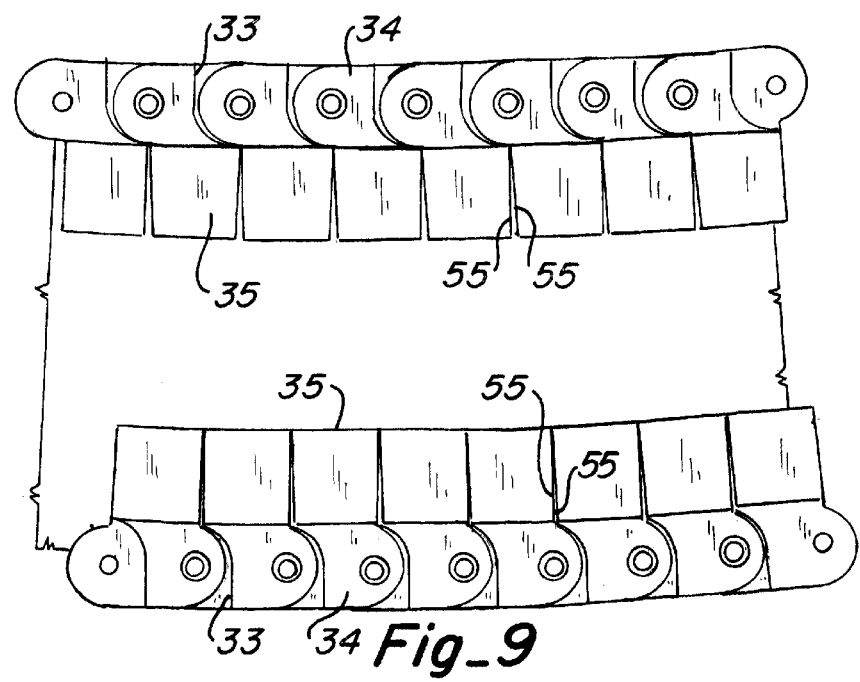

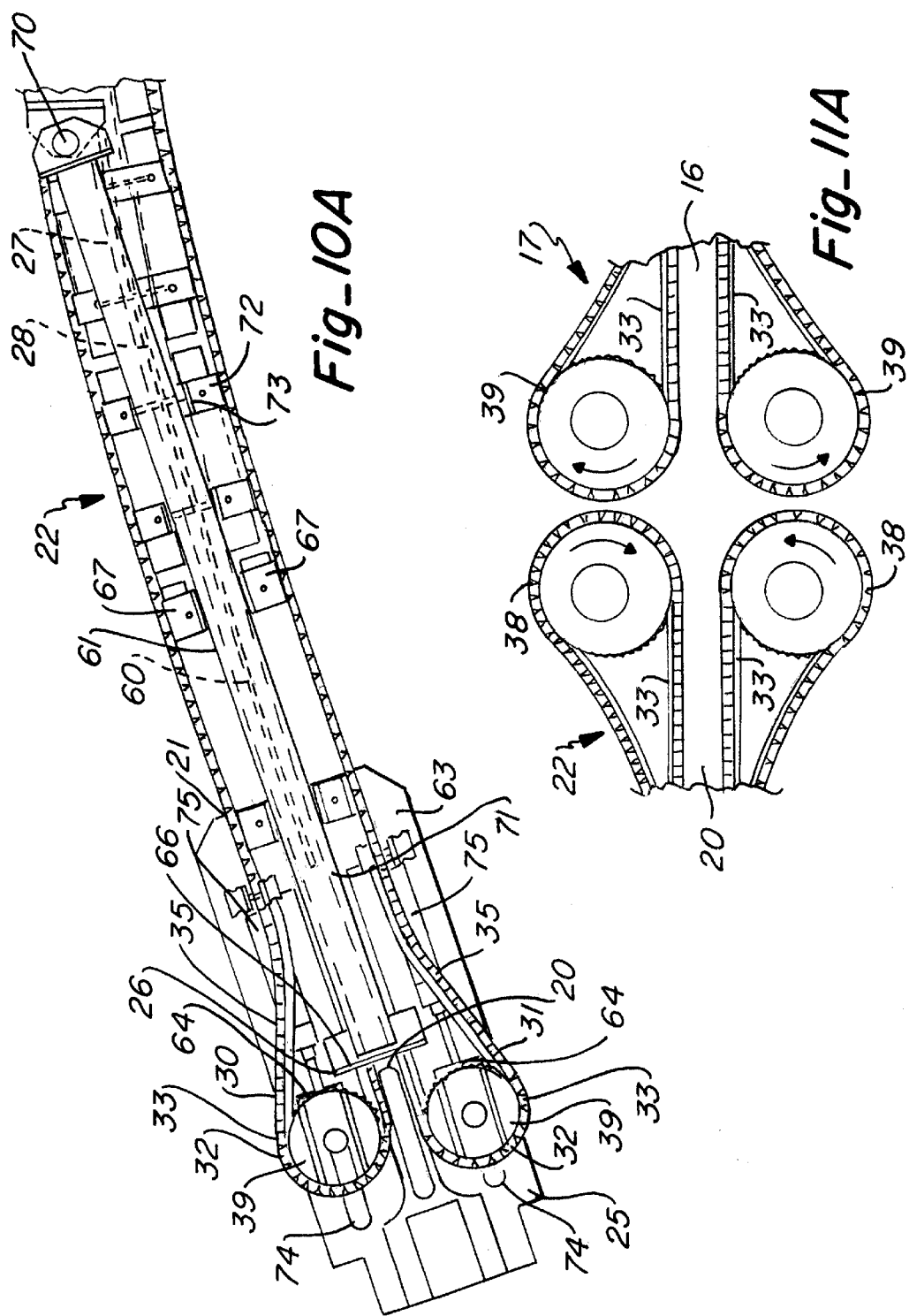

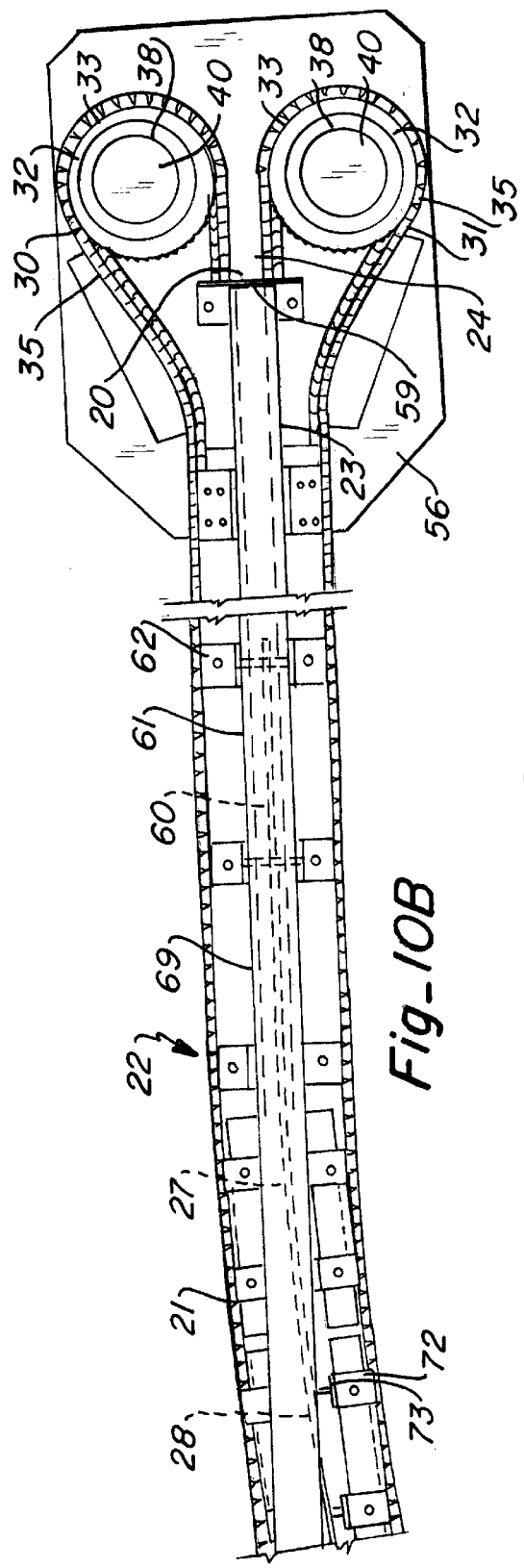
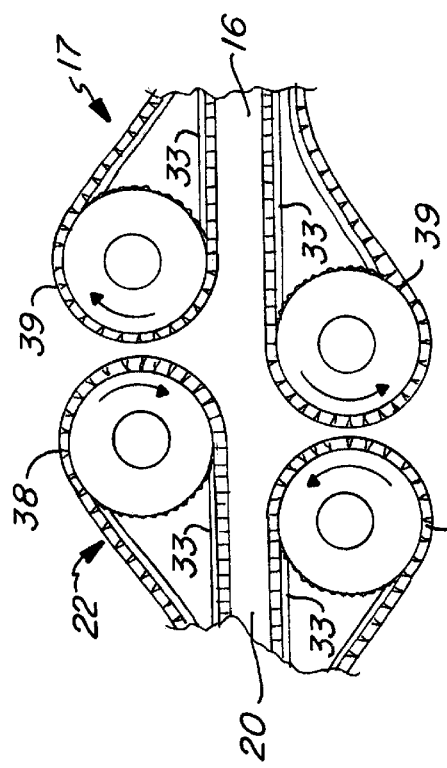
Fig_10B
Fig_11B

UNSTABLE ARTICLE CONVEYING DEVICE WITH DIVERTER

FIELD OF THE INVENTION

This invention relates to an unstable article conveying device, and, more particularly, relates to a device with a diverter for conveying and diverting unstable articles, particularly unstable articles having a neck portion with a neck ring thereon, between a single path, or line, and multiple paths, or lines.

BACKGROUND OF THE INVENTION

It is oftentimes necessary to convey articles between different locations, such as, for example, moving articles from one location to another in connection with various steps in manufacturing, storage and/or use of articles, or containers. Such articles must sometimes be moved in single line, or file, and at other times must be moved in multiple line or mass, between locations, and conveying systems for effecting article movement between multiple line or mass to single line and/or from single line to multiple line or mass are now well known.

Particular difficulty has been encountered, however, in conveying lightweight unstable articles, such as plastic containers or bottles, from one location to another location due, at least in part, to the tendency of such articles to easily tip during movement.

Where such articles have a neck ring, it is also known that such articles can be engaged and supported by elongated guides or movable flanges engaging the bottom side of the neck ring with movement of the articles along the guides being urged by air directed at the articles (see, for example, U.S. Pat. No. 4,284,370 (Danler et al.), U.S. Pat. No. 4,724,035 (Mann et al.), U.S. Pat. No. 4,822,214 (Aidlin et al.), U.S. Pat. No. 4,938,636 (Aidlin et al.), U.S. Pat. No. 5,028,174 (Karass), U.S. Pat. No. 5,100,265 (Mirkin), U.S. Pat. No. 5,147,153 (Aidlin et al.), U.S. Pat. No. 5,161,919 (Smith et al.), U.S. Pat. No. 5,246,097 (McCoy et al.), U.S. Pat. No. 5,299,889 (Langenbeck) and U.S. Pat. No. 5,501,552 (Simkowski)) or with movement of the articles being urged by movement of the flanges (see, for example, U.S. Pat. No. 5,937,998 (Priero)).

It is also known that sections of fixed guides engaging the neck rings of the articles can be curved to cause a deviation, or turn, in the article flow path (see, for example, U.S. Pat. No. 5,501,552 (Simkowski)), and that fixed guides engaging the neck rings of articles can be flexed to provide height adjustment of the article flow path (see, for example, U.S. Pat. No. 5,630,679 (Simkowski et al.)).

It is likewise also known that unstable articles being air conveyed along a path established by fixed position guides can be diverted to auxiliary, or other, paths through the use of diverters (see, for example, U.S. Pat. No. 4,822,214 (Aidlin et al.), U.S. Pat. No. 4,938,636 (Aidlin et al.), U.S. Pat. No. 5,246,097 (McCoy et al.), and U.S. Pat. No. 5,501,552 (Simkowski)), and that displaceable arms can be pivoted to divert articles between single and multiple lines (see, for example, U.S. Pat. No. 5,567,091 (Johnson et al.) and EPO Publication 0 668 223 (Steinle) where air is utilized to urge the articles through the displaceable arm, U.S. Pat. No. 3,822,006 (Shuttleworth) and U.S. Pat. No. 5,174,430 (Ebira) where belts are utilized to convey the articles through the displaceable arm, and U.S. Pat. No. 5,842,818 (Simkowski) where gripping fingers are utilized to convey the articles through the displaceable arm).

SUMMARY OF THE INVENTION

This invention provides an unstable article conveying device, particularly for unstable articles having a neck portion with a neck ring thereon, with the device including an article (or article line) diverter.

The unstable articles are conveyed along a first path (preferably in single line, or file) established by a first guide unit to a plurality of second paths (each preferably also conveying the articles in single line, or file) established by a plurality of second guide units through a third path established by a third guide unit having a diverter with a first portion establishing a first end portion path of the third path that is aligned with the first path established by the first guide unit, a second portion establishing a second end portion path of the third path with the second portion being movable to align the second end portion path with different ones of the plural second paths established by the plurality of second guide units, and a flexible portion (preferably including a flexible bar) establishing a deviation in the third path upon aligning movement of the second portion.

Aligning movement of the second portion of the diverter of the third guide unit, normally in opposite arcuate directions, is controlled by a controller (preferably acting in conjunction with a movable portion of a support bar of the diverter) to align the second end portion of the third path with different ones (preferably successive adjacent ones) of the second paths established by the plurality of second guide units.

An article actuator, with article engagable members, is provided within an actuator path at each actuator guide of each guide unit, with each article actuator preferably being a movable chain within a chain (actuator) path and having flanges extending therefrom to engage the articles in the article path adjacent to the chain path. An actuator guide of each guide unit is also preferably positioned at opposite sides of each article path, to engage the articles and urge the articles along the article path upon movement of the article actuators along the actuator paths.

It is therefore an object of this invention to provide improved article conveying.

It is another object of this invention to provide improved article conveying for unstable articles having a neck portion with a neck ring thereon.

It is another object of this invention to provide improved unstable article conveying utilizing article diverting.

It is another object of this invention to provide improved article diverting for conveying of unstable articles between a single line, or path, and multiple lines, or paths.

It is another object of this invention to provide an improved unstable article conveying device and method with article, or line, diverting for conveying unstable articles between a single line, or path, and multiple lines, or paths.

It is another object of this invention to provide an improved unstable article conveying device that includes a movable diverter with a flexible portion that causes a deviation in the article path at the diverter upon movement of the diverter to align a single line and different ones of multiple lines.

It is another object of this invention to provide an improved unstable article conveyor that includes a movable diverter with a flexible portion connected with a support bar having a movable portion and a controller for controlling movement of the movable portion of the support bar to cause movement of the diverter to align a single line and different ones of multiple lines with the aligning movement of the diverter also causing the flexible portion of the diverter to establish a deviation in the article path at the diverter.

It is another object of this invention to provide an improved unstable article conveyor that includes a first guide unit establishing a first path for the unstable articles and having article actuation associated with the first portion for urging the unstable articles along the first path, a plurality of second guide units each establishing a second path for the unstable articles and having article actuation associated with each of the plural second paths for urging the unstable articles along the plural second paths, and a third guide unit establishing a third path with the third guide unit having a diverter with article actuation associated with the third path for urging the articles along the third path and with a first portion of the diverter establishing a first end portion path of the third path aligned with the first path established by the first guide unit, a second portion establishing a second end portion path of the third path with the second portion being movable to align the second end portion with different ones of the plural second paths established by the plurality of second guide units, and a flexible portion establishing a deviation in the third path upon aligning movement of the second portion to align the second end portion with different ones of the second paths.

With these and other objects in view, which will become apparent to one skilled in the art as the description proceeds, this invention resides in the novel construction, combination, arrangement of parts, and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIGS. 2A and 2B, taken together, present a top view of the diverter shown in FIG. 1 positioned for straight path operation;

FIGS. 3A and 3B, taken together, present a side view of the diverter shown in FIGS. 2A and 2B;

FIG. 4 is an end section view of the diverter taken through lines 4—4 of FIG. 3A;

FIG. 5 is a section view taken through lines 5—5 of FIG. 3B;

FIG. 6 is a perspective view illustrating a section of the chain used to provide article drive to urge the unstable articles along the article paths;

FIG. 7 is a perspective view of one link of the chain illustrated in FIG. 6;

FIG. 8 is a simplified top view illustrating positioning of the flanges of the chain links during straight line movement of a chain, as illustrated in FIGS. 6 and 7, adjacent to one side of an article path;

FIG. 9 is a simplified top view similar to that of FIG. 8 but illustrating movement of a pair of chains at opposite sides of an article path during a deviation, or turn, in the article flow path;

FIGS. 10A and 10B, taken together, present a top view similar to that presented by FIGS. 2A and 2B, but illustrating positioning and operation of a pair of chains during movement of the unstable articles along an article path with a deviation therein established by flexing of the flexible portion of the diverter;

FIG. 11A is a simplified partial top view of adjacent end portions of article actuator guide units illustrating end-to-end placement of adjacent end portions with side-by-side sprocket positioning; and FIG. 11B is a simplified partial top view similar to that of FIG. 11A, but illustrating offset sprocket placement.

DESCRIPTION OF THE INVENTION

Figure 1:
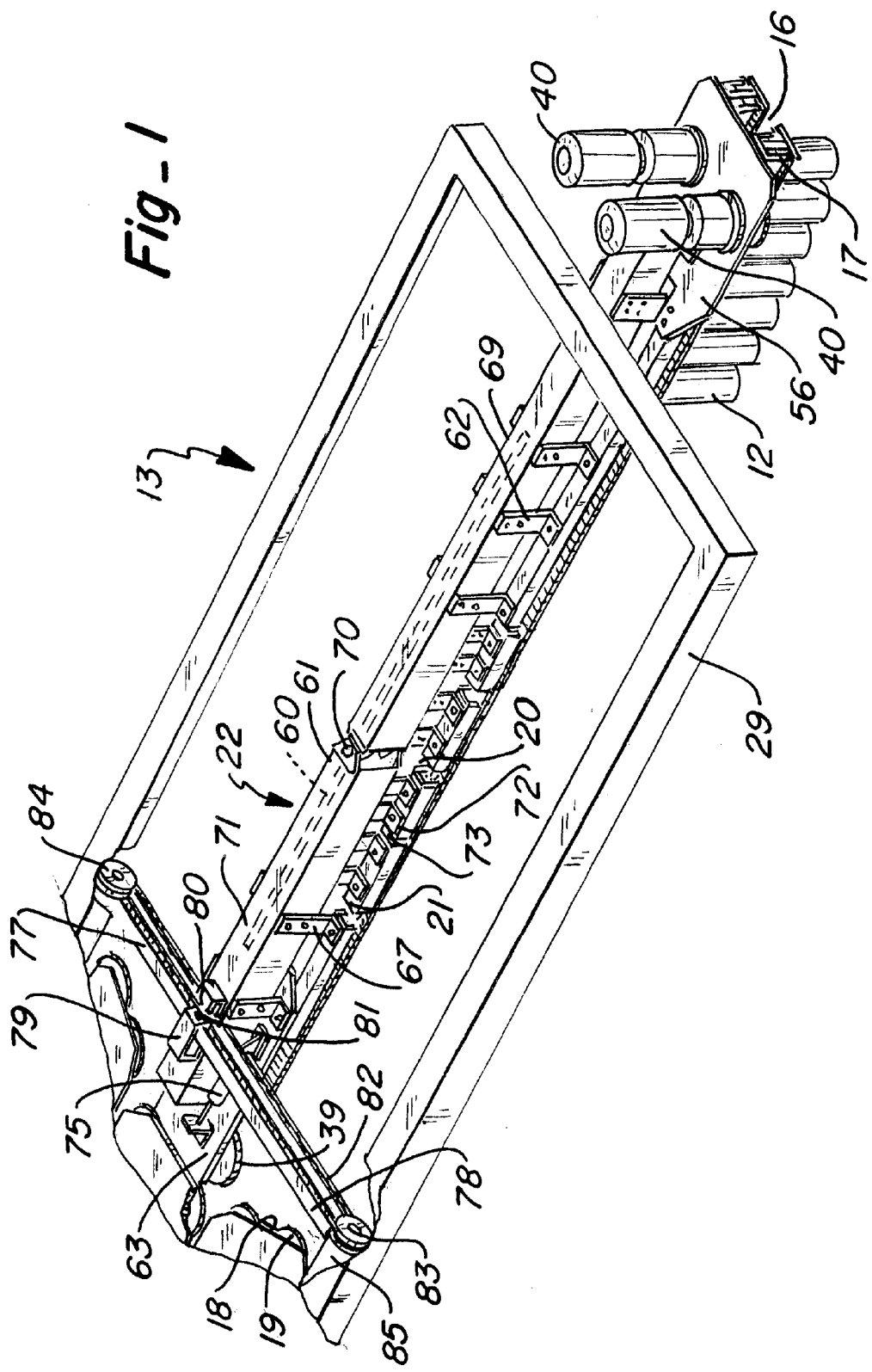
FIG. 1 is a perspective view of the device of this invention.

Articles 12 to be conveyed, or transferred, by device 13 of this invention are normally lightweight unstable articles, such as plastic containers or bottles, and such containers or bottles may have a neck portion 14 with a neck ring 15 thereon, as has been indicated in the drawings.

It is meant to be realized, however, that other lightweight articles, and particularly lightweight unstable articles, could, at least for some applications, also be conveyed, or transferred, by the device of, and in accordance with, this invention.

As best shown in FIG. 1, unstable articles 12 are conveyed into device 13, normally in single file, and are received at device 13 on first article path 16 established by first guide unit 17. The unstable articles received on first article path 16 are conveyed to different ones of plural, or multiple, second article paths 18, established by a plurality of second guide units 19, through third article path 20, also normally in single file, established at movable guide, or diverter, 21 of third guide unit 22.

Diverter 21, as best shown in FIGS. 2A, 2B, 3A and 3B, with straight line operation illustrated, has first portion 23 establishing first end portion path 24 of third article path 20 (aligned with first article path 16 as illustrated in FIG. 1), second portion 25 establishing second end portion path 26 of third article path 20 (with second portion 25 being movable to align second end portion path 26 with different ones of plural second article paths 18 (as illustrated in FIG. 1), and flexible portion 27 establishing divertable, or displaceable, portion path 28 of third article path 20 with flexible portion 27 being flexed upon aligning movement of second portion 25 causing a deviation in divertible portion path 28 of third article path 20 to align second end portion path 26 of third article path 20 with different ones of plural second article paths 18.

While three second guide units 19 have been illustrated in FIG. 1, it is to be realized that the configuration and/or number is meant to be an illustrative example, and any plural number, as needed or desired, could normally be utilized.

The guide units (i.e., first, second, and third guide units 17, 19, and 22) are mounted on frame 29, and each guide unit includes at least one actuator unit 30, and preferably includes a pair of actuator guides 30 and 31, with the guides of each pair positioned at opposite sides of an associated article path (i.e., one of article paths 16, 18, and 20) established therebetween and extending lengthwise between the guides (with the guides thus being spaced from one another a sufficient distance to enable the articles to be conveyed along the article path established between the guides).

This arrangement is best illustrated in FIGS. 2A, 2B, 4, and 5 for diverter 21 of third guide unit 22, and a similar arrangement is preferably also utilized with respect to the first and second guide units (but normally with no provision for flexing to establish a deviation, or bend, in the article path as is provided in article path 20), although the articles may, at least for some applications, be air conveyed through the first and second guide units in a manner such as taught in my U.S. Pat. No. 5,842,818 (Simkowski).

Each of the pair of actuator guides 30 and 31 includes an article drive arrangement 32, now preferably a mechanical drive arrangement, with each mechanical drive arrangement, or unit, including, as best illustrated in FIGS. 4 through 7, a driven chain 33 having a plurality of links 34 with flanges 35 that extend from the chain to the article path associated with the actuator guide having the chain in actuator, or chain, path 36 to engage and urge article movement of articles then on the article path by movement of the chain along the lengthwise extending actuator path 36.

It is also meant to be realized that, while not now preferred, a single drive arrangement might, for some applications (and as generally illustrated in FIG. 8), be utilized at one side of the article path with a flange, ledge, or the like, utilized, for example, at the other side of the article to provide article support and/or that drive, or article actuation, might, for some applications, be utilized in addition, or in lieu of, the particular article drive arrangement described herein.

As best shown in FIGS. 4 and 5 and particularly described herein for conveyance of unstable articles 12 having neck portions 14 with neck rings 15 thereon, and using chain 33 with links 34 having flanges 35 extending therefrom to engage and urge the unstable articles along the associated article path, flanges 35 are preferably spaced from one another a sufficient distance to receive neck portions 14 (normally vertically extending as illustrated in the drawings) of unstable articles 12 therebetween and engage the bottom side of protruding neck rings 15 of the unstable articles to support the unstable articles and, due to frictional engagement between the articles and flanges, urge movement of the unstable articles along the article path established between the actuator guides and spaced flanges upon movement of chain 33 along chain path 36 (extending along and adjacent to the associated article path) in each of the actuator guides.

Additional support for articles conveyed along the article paths, such as, for example, side support provided by flanges depending from the actuator guides at opposite sides of the article paths for engagement with the sides of the articles in the article paths, can also be utilized, as needed.

Third guide unit 22 is adapted, by use of movable guide, or diverter, 21, to divert third article path 20, as necessary, upon movement of second portion 25 of the diverter to align first article path 16 with different ones of plural second article paths 18. More particularly, articles 12 conveyed along first article path 16 are received at first end portion path 24 of third article path 20, diverted as necessary in divertable portion path 28 of third article path 20, and conveyed from second end portion path 26 of third article path 20 to a then aligned one of plural second article paths 18.

All of the guide units now preferably utilize the above-described chain drive for conveying the unstable articles through the guide units as set forth hereinafter with respect to third guide unit 22, with third guide unit 22 being also particularly adapted for article, or article line, diversion as set forth hereinafter.

Major axis 37 of each link 34 of chain 33 extends in a direction normal (i.e., perpendicular) to the direction of chain path 36 established in each of the actuator guides 30 and 31. As best illustrated by FIGS. 6 and 7, when chain path 36 is horizontal, then major axis 37 of each link 34 extends vertically. This positioning of chain 33 is shown in FIG. 4 and 5 to be effected in actuator guide 30 with actuator guide 30 substantially surrounding, or enclosing, chain 33.

As best indicated in FIGS. 2A and 2B in conjunction with FIGS. 4 and 5, each guide unit 30 and 31 includes chain 33, preferably an endless chain that extends around sprockets 38 and 39 with sprocket 38 being rotatively driven by electric motor/gear box 40 to cause movement of each chain 33 along chain path 36. With use of a pair of actuator guides 30 and 31 positioned at opposite sides of an associated article path, separate endless chains 33 with flanges 35 extending therefrom are thus positioned at opposite sides of the associated article path (as generally indicated in FIG. 9) so that flanges 35 engage articles at each side of the article path for urging movement of unstable articles then on the article path along the associated article path upon movement of chains 33 along chain paths 36.

Each actuator guide has an elongated opening 41 that extends along the entire guide wall 42 facing the article path to enable flanges 35 to extend, from each link 34 of chain 33 in chain path 36 then within the guide, into the adjacent associated article path.

As best shown in FIG. 7, each link 34 of chain 33 has a pair of end plates, or ears, 43 and 44 that extend in a plane parallel to the direction of chain movement (i.e., horizontal when the direction of chain movement is horizontal) with end plates 43 and 44 being spaced from one another along major axis 37 of each link (i.e., vertically spaced when the direction of article movement is horizontal), with apertures 45 therein to receive linking pins 46 (as indicated in FIG. 6) between end plates 43 and 44, and with end plates 43 and 44 having contoured edge, or side, portions 47.

Each chain link 34 also has a body portion 48 that includes a cylindrical portion 49 that extends in a direction normal to the direction of chain path 36 (i.e., extends vertically when chain path 36 extends horizontally). End plates, or ears, 50 are at opposite ends of cylindrical portion 49 and extend in a plane normal to cylindrical portion 49 (i.e., are horizontally positioned when cylindrical portion 49 is vertically positioned), with cylindrical portion 49 and end plates 50 having apertures 51 therethrough for receiving linking pin 52 (linking pin 52, as illustrated in FIG. 6, is indicative of the linking pin needed to complete the endless chain and hence, when so used, becomes an additional linking pin 46).

End plates 50 also extend under end plates 43 and 44 for connection to end plates 43 and 44 thereat, with end plates 50 having edge, or side, portions 53 (i.e., vertically extending when end plates 50 are horizontally positioned) that are offset from end plates 43 and 44, and each link also having wall 54 extending between end plates 43 and 44 and cylindrical portion 49 at the side of the link from which flanges 35 extend for strengthening the link.

As best shown in FIGS. 4 and 5, each flange 35 extends from the lower end portion (and therefore from end plate 43 and from the bottom of wall 54) of each link 34 in a direction normal to both chain path 36 and major axis 37 of each link 34 (i.e., each flange 35 extends horizontally from each chain link 34 and from wall 54 when chain path 36 extends horizontally) to engage articles then on the associated article path.

As indicated in FIGS. 6 and 7, when links 34 are connected, or joined, by the linking pins to form endless chain 33, adjacent links have the cylindrical portion of one link received between end plates 43 and 44 of an adjacent link with contoured, or shaped, side edges 47 of each of end plates 43 and 44 of adjacent links, as well as side edges 53, adjacent to cylindrical portion 49 of adjacent links, permitting rotation of each link with respect to each adjacent link in the chain.

With adjacent links joined to form an endless chain, flanges 35 of adjacent links extending into the associated article path are contiguous to one another, as indicated in FIGS. 8 and 9, to virtually form a moving continuous support for engaging articles then in the associated article path and urge the articles along the path upon movement of the endless chain to cause the flanges to be moved along the article path.

As indicated in FIG. 8 (illustrating a chain at one side of the article path), during a straight run of the chain, flanges 33 extend substantially parallel with respect to one another into the article conveying path with substantially equal small spacing between adjacent edges 55 of each of the flanges.

As indicated in FIG. 9, angular deviations, or bends, in the associated article conveying path are enabled since adjacent links of the chains can be rotated with respect to one another to a degree sufficient to allow angular deviation of the chain path.

As indicated, with chains utilized at opposite sides of the angular deviating section of the associated article path, flanges 35 at one side of the associated article conveying path are angularly deviated, or rotated, in one direction so that adjacent flanges have an increased spacing at the outer edges of adjacent flange edges 55, while flanges 35 at the opposite side of the associated article path are angularly deviated, or rotated, in the opposite direction so that adjacent flanges have a decreased spacing at the outer edges of adjacent flange edges 55.

In a working embodiment of this invention, it has been found that a spacing of about 0.020 inches when parallel with a maximum increase and/or decrease in spacing of about 0.010 inches for turns results in about a permissible 24 inch turning radius.

It has also been found in a working embodiment of this invention that use of dissimilar material for the chain and chain guide is preferred, with use of dissimilar polymer materials being now preferred, including, for example, Acetal for the chain and oil impregnated ultra high molecular weight (UHMW) polymer for the chain guide.

To effect angular deviations, or bends, at divertible, or deviation, portion path 28 of third article path 20, flexible portion 27 of diverter 21 is flexed, or bent, at flexible portion 27.

As best shown in FIGS. 2A, 2B, 10A, and 10B, third article path 20 is established at diverter 21 of third guide unit 22 between actuator guides 30 and 31, and flexible portion 27, preferably a vertically positioned flexible bar of metallic material such as aluminum or steel, of the diverter establishes divertible portion path 28 of the third article path between first and second end portion paths 24 and 26 of the third article path.

First portion 23 of diverter 21 (establishing first end portion path 24 of article path 20 aligned with first article path 16) includes mounting plate 56 having a pair of drive mounts 57 mounted thereon. A sprocket 38 is rotatively mounted on each of drive mounts 57 and positioned to be at each side of the associated article path so that each sprocket 38 is driven by motor/gear box 40.

Actuator guides 30 and 31, each having chain 33 in chain path 36, are mounted on mounting plate 56, spaced from one another, to form, or establish, first end portion path 24 of third article path 20 between the inner run of the chain in each actuator guide, inwardly of sprockets 38, with the outer side of each guide having a chain diverter 58 to divert the outer, or return, portion of the endless chain from sprockets 38 into the actuator guides.

In addition, bracket 59 is also mounted on mounting plate 56 with bracket 59 extending upwardly from mounting plate 56 above actuator guides 30 and 31 for mounting of flexible bar 60 (inwardly of bracket 59) and one end of support bar 61 to bracket 59 (straps 62 are utilized to fasten the actuator guides to flexible bar 60 and support bar 61 at mounting plate 56).

Second portion 25 of diverter 21 (establishing second end portion path 26 of third article path 20 alignable with different ones of plural article paths 18) includes mounting plate 63 having a pair of sprocket mounts 64 mounted thereon (a sprocket 39 is rotatively mounted on each of sprocket mounts 64 and positioned to be at each side of the article path).

Actuator guides 30 and 31, having chains in chain paths 36, are mounted on mounting plate 63 spaced from one another, and inwardly from sprockets 39, to form, or establish, second end portion path 26 of third article path 20 therebetween with the outer side of each guide having a chain diverter 65 to divert the outer, or return, portion of the endless chain from sprockets 39 into the guide.

In addition, bracket 66 is also mounted on mounting plate 63 with bracket 66 extending upwardly from mounting plate 63 above actuator guides 30 and 31 for mounting of support bar 61 thereto (straps 67 are utilized to fasten the actuator guides to support bar 61 and mounting plate 63, with flexible bar 60 being received in flexible bar mount 68 (as best shown in FIG. 4, flexible bar mount 68 is a plastic insert, or block, having an aperture therein slightly larger than the dimensions of the flexible bar to receive the flexible bar therein) between straps connected with different ones of the actuator guides so that the flexible bar is lengthwise movable along the straps (and hence relatively movable with respect to support bar 61 and mounting plate 63).

Support bar 61 has fixed end 69 connected to bracket 59 (connected with mounting plate 56 of first portion 23 of diverter 21) with bar 61 having a pivot 70 to enable movable, or pivotable, end 71 of bar 61 to move, or pivot, in opposite horizontal directions, with movable, or pivotable, end 71 being received at, and connected to bracket 66 (connected with mounting plate 63 of second portion 25 of diverter 21).

Flexible bar 60 extends lengthwise inwardly of brackets 59 and 66 of first and second portions 23 and 25 of line diverter 21 with one end of flexible bar 60 being slidably received between straps 67 to enable lengthwise movement of flexible bar 60 relative to straps 67 (for some applications, flexible bar 60 could be slidably received between straps 62 in lieu of being slidably received between straps 67).

Spaced sections 72 of actuator, or chain, guides 30 and 31 (with the spaced sections being preferably connected in pairs, as shown in FIGS. 1, 2A, 2B, 3A and 3B) are connected to flexible bar 60 by straps 73 at flexible portion 27 of diverter 21 with sufficient spacing between adjacent chain guide straps to enable flexing of flexible bar 60 (due to movement of second portion 25 of diverter 21 relative to first portion 23 of the diverter upon pivoting of pivotable end 71 of support bar 61 relative to fixed end 69 of the support bar) as necessary for path alignment between second end portion path 26 and different ones of plural second paths 18.

As indicated in FIGS. 2A and 10A, sprockets 39 are mounted in lengthwise extending slots 74 on second portion 25 of diverter 21 to enable movement of each sprocket 39 in opposite directions along a path parallel to that of chain path 36 (and third article path 20).

As indicated in FIGS. 2A and 2B, with a straight third article path 20 through diverter 21, chain path 36 at each side of third article path 20 is preferably the same length, and sprockets 38 and 39 are spaced the same distance from one another.

When a deviation occurs in third article path 20 by flexing of flexible portion 28 of the diverter, as is indicated in FIGS. 10A and 10B, this causes the chain path at the outer side of the deviation to travel a distance greater than the distance traveled by the chain at the inner side of the diverter, and this requires that movable sprocket 39 at the outer side of the deviation be inwardly offset relative to movable sprocket 39 at the inner side of the deviation in order to maintain proper tensioning of the endless chains. This is accomplished by air cylinders 75, mounted on mounting plate 63 adjacent to each sprocket 39, to control lengthwise movement of each of the sprockets along slot 74 (air cylinders 75 have air tubes commonly connected to an air supply tube connected with an air supply, normally 30 psi, to provide the necessary balance, or tension, for chain tensioning).

Transfer of articles between actuator guide units, each of which includes a pair of actuator guides, normally having the sprockets of each guide of the pair of actuator guides in side-be-side relationship, can, and normally is, effected by end-to-end aligned positioning of the sprockets of the adjacent ends of the actuator guides and urging the articles from one actuator guide to the other along the article paths established between the pair of actuator guides of each of the actuator guide units (such as, for example, as illustrated in FIG. 11A, by positioning sprockets 39 and 38 of adjacent guide units 17 and 22 adjacent to one another with article paths 16 and 20 (established by chains 33) aligned so that articles discharged from path 16 are urged toward and enter path 20).

If needed, movement of the articles across the relatively short space between the adjacent article paths established by adjacent actuator guide units can be provided with a fixed support structure, such as, for example, fixed spaced ledges, or flanges, engagable with the articles between the adjacent sprockets of each of the actuator guide units and/or use of a driving force, such as air, to urge the articles between the actuator guide units.

As an alternative to the foregoing (or, if needed as an addition or partial supplement to all or a part thereof), the relatively short space between the adjacent article paths can be effectively shortened by offsetting the sprockets of each pair of actuator guides of the adjacent guide units (such as, for example, as illustrated in FIG. 11B, by positioning sprockets 39 and 38 of each pair of actuator guides of the then adjacent guide units 17 and 22 offset from one another so that the article paths 16 and 20 (established by chains 33) are effectively lengthened to leave little, if any, spacing between the path ends).

Positioning of diverter 21 for alignment of first end portion path 24 of third article path 20 with the different ones of plural article paths 18 nay be effected by controller 77. As is shown in FIG. 1, controller 77 includes controller support 78 extending across second portion 25 of line diverter 21 with controller support 78 having carriage 79 slidably mounted thereon so that the carriage moves in reciprocal directions back and forth across control support 78.

Carriage 79 is connected with support bar 61 by means of connecting arm 80 so that movement of carriage 79 causes angular displacement of pivotable end portion 70 of support bar 61 resulting in flexing of flexible bar 60 to cause an angular deviation to be established by the spaced sections 72 of actuator guides 30 and 31 at flexible portion 27 of diverter 21 and thus establish an angular deviation at divertable portion 28 of third article path 20.

Carriage 79 is connected by connecting arm 81 with chain 82 mounted for rotation about sprockets 83 and 84 near the opposite ends of controller support 78, and sprocket 83 is rotatively driven by electric motor 85 to drive chain 82 and precisely position second portion 25 of line diverter 21 at a then selected one of the plurality of second guide units 19 to thereby align second end portion path 26 of third article path 20 with the then selected one of plural second article paths 18.

Controller 77 could also be realized by other apparatus, such as, for example, through use of a screw drive arrangement, particularly where more precise positioning of the diverter is needed than is normally provided by a chain-carriage arrangement.

As indicated in FIG. 1, the plural second article paths 18 at the plurality of second guide units 19 are preferably adjacent to one another about an arcuate path at the ends thereof adjacent to second portion 25 of line diverter 21 to facilitate alignment with the second end portion path of the third article path, and may thereafter be brought toward substantially parallel relationship with one another.

Second end portion 26 of third article path 20 is preferably successively and sequentially aligned with each adjacent one of plural second article paths 18 by repeated and/or additional flexing of flexible portion 27 of line diverter 21 as electric motor 85 causes second end portion path 26 to be moved in position from one second path 18 to the next adjacent path, preferably by movement in one arcuate direction until the outer plural second article path is reached, and then in the opposite arcuate direction until the opposite outer plural second article path is reached, with the alternate directions of displacement of the second end portion path being continued so long as normal operation is continued.

An article counter 86 (indicated in FIG. 2A as a spaced eye and receptor positioned to count articles passing therebetween) is positioned adjacent to second end portion path 26 of line diverter 21 to count the number of unstable articles passed from second end portion path 26 of article path 20 to plural second article paths 18 so that each time that a predetermined count is reached, article counter 86 can cause actuation, or energization, of electric motor 85 to shift delivery of unstable articles from a then selected one of the plural second article paths to an adjacent one of the plural second article paths.

While a specific controller has been described herein for controlling line diverting, it is meant to be realized that control of line diverting, other than as above described, could also be utilized.

In addition, it is also to be realized that the unstable articles are normally discharged from the second guide units for further conveyance, such as, for example, for conveyance to a palletizer for palletizing the unstable articles, and it is also meant to be realized that the direction of article flow could be reversed to transfer the unstable articles from the plural second paths to the first path through the third path, and that such transfer could, for example, be used in connection with depalletizing of unstable articles.

As can be appreciated from the foregoing, this invention provides an improved conveying system using article, or line, diverting for conveying unstable articles and, particularly, for conveying unstable articles, such as plastic bottles or containers, having a neck ring, between a single path, or line, and multiple paths, or lines.

What is claimed is:

1. A device for conveying unstable articles, said device comprising:
    a first guide unit establishing a first path for the unstable articles and having article actuation associated with said first path for urging the unstable articles along said first path;

a plurality of second guide units establishing plural second paths for the unstable articles and having article actuation associated with each of said plural second paths for urging the unstable articles along said plural second paths;

a third guide unit establishing a third path for the unstable articles with said third guide unit having a movable article diverter with article actuation associated with said third path for urging the unstable articles along said third path, said article diverter having a first portion establishing a first end portion path of said third path aligned with said first path, a second portion establishing a second end portion path of said third path with said second portion being movable to align said second end portion path with different ones of said plural second paths, and a flexible portion establishing a deviation in said third path upon said aligning movement of said second portion; and a controller for controlling movement of said second portion of said article diverter to align said second end portion path with said different ones of said plural second paths.

2. The device of claim 1 wherein said paths for the unstable articles are established by said guide units such that the unstable articles are conveyed along said paths in single line.

3. The device of claim 1 wherein said article actuation at each of said guide units includes at least one article actuator and an actuator guide for establishing an actuator path extending along and adjacent to said associated article path with said actuator guide at said article diverter of said third guide unit including a plurality of spaced sections at said flexible portion of said article diverter.

4. The device of claim 3 wherein said flexible portion of said article diverter includes a flexible bar having said spaced sections of said actuator guide connected therewith with flexing of said flexible bar enabling said deviation in said third path.

5. The device of claim 4 wherein said flexible bar of said article diverter is caused to be repeatedly flexed by movement of said second portion of said article diverter to align said second end portion of said third guide unit with said different ones of said plural second paths.

6. The device of claim 4 wherein said flexible bar of said article diverter extends between said first and second portions of said article diverter and is relatively movable with respect to one of said first and second portions, wherein said article diverter also includes a support bar having a movable portion connected with said second portion of said article diverter, and wherein said controller includes a positioning unit connected with said movable portion of said support bar for causing movement of said movable portion of said support bar to thereby cause said movement of said second portion of said article diverter to control and position said second portion of said article diverter so that said second end portion path of said third path is aligned with said different ones of said plural second paths.

7. The device of claim 3 wherein each of said article actuators includes a mechanical driving unit that moves along said actuator path established by said actuator guide for urging the unstable articles along said associated article path.

8. The device of claim 7 wherein each of said mechanical driving units includes a movable chain having flanges extending therefrom for engagement with the unstable articles on said associated article path for urging the unstable articles along said associated article path.

9. The device of claim 1 wherein each of said guide units includes first and second actuator guides with article actuators positioned at opposite sides of said associated article path, with each of said article actuators including a movable chain with said flanges of said chains extending toward said associated article path to engage unstable articles therein and urge the unstable articles along said associated article path upon movement of said chains along said actuator paths established by each of said first and second actuator guides.

10. The device of claim 1 wherein the unstable articles are plastic bottles having a neck portion with a ring thereon, and wherein said guide units are engagable with said neck rings for supporting and urging said plastic bottles along said paths.

11. A device for conveying unstable articles, said device comprising:

a first guide unit establishing a first path for the unstable articles and having an article actuator for urging the unstable articles along said first path;

a plurality of second guide units establishing plural second paths for the unstable articles and each having an article actuator for urging the articles along said plural second paths;

a third guide unit establishing a third path for the unstable articles with said third guide unit having a movable article diverter with a pair of article actuators each including a movable chain having flanges extending therefrom for engagement with the unstable articles on opposite sides of said third path for urging the unstable articles along said third path, said article diverter having a first portion establishing a first end portion path of said third path aligned with said first path, a second portion establishing a second end portion path of said third path with said second portion being movable to align said second end portion path with different ones of said plural second paths, and a flexible bar extending between said first and second portions and lengthwise movable with respect to at least one of said first and second portions, said flexible bar establishing a deviation in said third path upon flexing of said flexible bar due to said aligning movement of said second portion; and a controller for controlling movement of said second portion of said article diverter for causing said aligning movement of said second end portion to align said second end portion path with said different ones of said plural second paths.

12. The device of claim 11 wherein said article diverter also includes a support bar having a movable portion connected with said second portion of said article diverter, and wherein said controller is connected with said movable portion of said support bar to control movement thereof to thereby position said second portion of said article diverter to align said second end portion path of said article diverter with said different ones of said plural second paths.

13. The device of claim 11 wherein each of said movable chains of said article actuators of said article diverter is rotated about sprockets mounted on said first and second portions of said article diverter with at least one of each of said sprockets being movably mounted on one of said first and second portions of said article diverter for maintaining chain tensioning responsive to flexing of said flexible bar of said article diverter.

14. The device of claim 13 wherein said movable sprockets are movably mounted on said second portion of said article diverter, and wherein said article diverter also includes air cylinders connected with said movable sprockets to control movement of said movable sprockets upon flexing of said flexible portion of said guide to maintain chain tension.

15. A single-to-multiple line conveying device for unstable articles each of which has a neck portion with a neck ring thereon, said device comprising:

a first guide unit having a pair of spaced guides establishing a first single line path for the unstable articles between said pair of spaced guides with each of said spaced guides having a chain movable along a first chain path adjacent to said first single line path and with each said chain having article engaging members for urging the unstable articles along said first single line path upon movement of said chains along said first chain paths;

a plurality of second guide units each having a pair of spaced guides establishing adjacent multiple second single line paths for the unstable articles between each said pair of spaced guides with each of said pair of spaced guides having a chain movable along a second chain path adjacent to an associated one of said multiple second single line paths and with each said chain having article engaging members for urging the unstable articles along said associated multiple second single line path upon movement of said chains along said associated second chain paths;

a third guide unit having a movable line diverter with a pair of spaced guides establishing a third single line path between said spaced guides with each of said spaced guides having a chain movable along a third chain path adjacent to said third single line path with each said chain having article engaging members for urging the unstable articles along said third single line path upon movement of said chains along said third chain paths, and said line diverter having a first portion establishing a first end portion path of said third single line path, a second portion establishing a second end portion path of said third single line path with said second portion being movable to align said second end portion path with different ones of said multiple second single line paths, a flexible bar extending between said first and second portions and lengthwise moveable with respect thereto for establishing a deviation in said third single line path upon flexing of said flexible bar due to said aligning movement of said second portion, and a support bar having a pivotable portion connected with said second portion for causing movement of said second portion to align said second end portion with said different ones of said of said multiple second single line paths; and a controller connected with said support bar of said line diverter for controlling pivotal movement of said pivotable portion of said support bar to cause said aligning movement of said second end portion of said line diverter.

16. The device of claim 15 wherein each of said chains of said spaced guides of said guide units is rotated about sprockets at each end portion of said spaced guides with said article line paths being established thereat, and wherein said sprockets are positioned in one of side-by-side and offset relationship with respect to one another to facilitate transfer of articles between said guide units.

17. The device of claim 15 wherein said second portion of said line diverter is movable along an arcuate path, and wherein said controller causes movement of said second portion of said line diverter along said arcuate path to align said second end portion path of said third single line path of said line diverter with predetermined different ones of each of said multiple second single line paths of said plurality of second guide units.

18. The device of claim 17 wherein said controller includes a motor for positioning said second portion of said line diverter so that said second end portion path of said third single line path is caused to be sequentially aligned with each next adjacent one of said multiple second single line paths of said plurality of second guide units each time that said motor is actuated during normal operation, said controller also including an article counter for counting the number of the unstable articles moved from said third single line path to said multiple second single line paths with said article counter causing actuation of said motor whenever said article counter reaches a predetermined count.

19. In a device for conveying unstable articles, an article diverter for transferring the unstable articles between a first path and a plurality of second paths, said article diverter comprising:

a first portion establishing a fixed position first end portion path alignable thereat with the first path;

a second portion establishing a second end portion path with said second portion being movable between predetermined positions so that said second end portion path is aligned thereat with different ones of the plurality of second paths; and a flexible portion connected with said first and second portions and having a path established thereat to convey the unstable articles between said first and second end portion paths, said flexible portion being adapted to be flexed to cause a deviation in said path established thereat upon said aligning movement of said second portion whereby the unstable articles urged along said paths established at the article diverter are transferred through said then aligned paths.

20. The device of claim 19 wherein the article diverter includes at least one article actuator and an actuator guide for establishing an actuator path extending along and adjacent to said paths established for the unstable articles through the article diverter with the portion of said article actuator at said flexible portion including a plurality of spaced sections.

21. The device of claim 20 wherein said flexible portion of the article diverter includes a flexible bar having said spaced sections connected therewith whereby flexing of said flexible bar causes said deviation in said path established thereat.

22. The device of claim 21 wherein said flexible bar is relatively movable with respect to one of said first and second portions, wherein the article diverter also includes a support bar having a movable portion connected with said second portion of the article diverter, and wherein said controller includes a positioning unit connected with said movable portion of said support bar for causing moving of said movable portion of said support bar to control and position said second portion of the article diverter so that said second end portion path is aligned with different ones of the plural second paths.

23. The device of claim 20 wherein said article actuator includes a mechanical driving unit that moves along the actuator path for urging the unstable articles along said paths established at the article diverter.

24. The device of claim 23 wherein said mechanical driving unit includes a movable chain having flanges extending therefrom for engagement with the unstable articles on said paths established at the article diverter for urging the unstable articles along said paths established at the article diverter.

25. The device of claim 19 wherein the article diverter includes first and second article actuators and actuator guides at opposite sides of said paths established at the article diverter, and wherein each of said article actuators includes a chain movable along the associated one of said actuator guides with said flanges of each said chain extending toward said path established at the article diverter to engage unstable articles therein and urge the unstable articles along said path established at the article diverter upon movement of said chains along said actuator guides.

26. The device of claim 25 wherein said first and second portions of the article diverter include different ones of pairs of sprockets having said chains rotated thereabout, with at least one of said sprockets of each said pair being movably mounted to accommodate flexing of said flexible portion of the article diverter.

27. The device of claim 26 wherein said movably mounted sprocket of each said pair of sprockets has an air cylinder connected therewith whereby said air cylinders control movement of said sprockets to maintain chain tensioning upon flexing of said flexible portion of the article diverter.

28. The device of claim 19 wherein the unstable articles are lightweight containers.

29. A method for conveying unstable articles, said method comprising:
    establishing a first path for conveying the unstable articles;
    establishing plural second paths for conveying the unstable articles;
    establishing a third path for conveying the unstable articles with said third path having first and second opposite ends;
    aligning said first end of said third path with said first path;
    moving said second opposite end to align said second opposite end with different ones of said plural second paths;
    creating a deviation in said third path by bending said third path between said first and second opposite ends upon said aligning movement of said second opposite end; and
    urging the unstable articles through said aligned paths.

30. The method of claim 29 wherein said method includes providing a flexible path determiner adjacent to said third path between said opposite ends thereof and flexing said flexible path determiner to create said deviation in said third path.

31. The method of claim 30 wherein said method includes providing a flexible bar as said flexible path determiner to create said deviation in said third path.

32. The method of claim 31 wherein said method includes providing a support bar having a movable portion for causing said aligning movement of said second end of said third path.

33. The method of claim 29 wherein said method includes providing a chain with flanges to urge the unstable articles along said then aligned paths.

34. The method of claim 33 wherein said method includes providing sprockets having said chain rotated thereabout, and wherein said method further includes moving one of said sprockets to maintain chain tensioning upon deviation of said third path.

35. The method of claim 29 wherein said method includes controlling said movement of said second end of said article diverter to align said second end with predetermined ones of said plural second paths.

* * * * *